(No Model.)
J. AENIS.
SCHOOL DESK.
No. 416,660.	Patented Dec. 3, 1889.
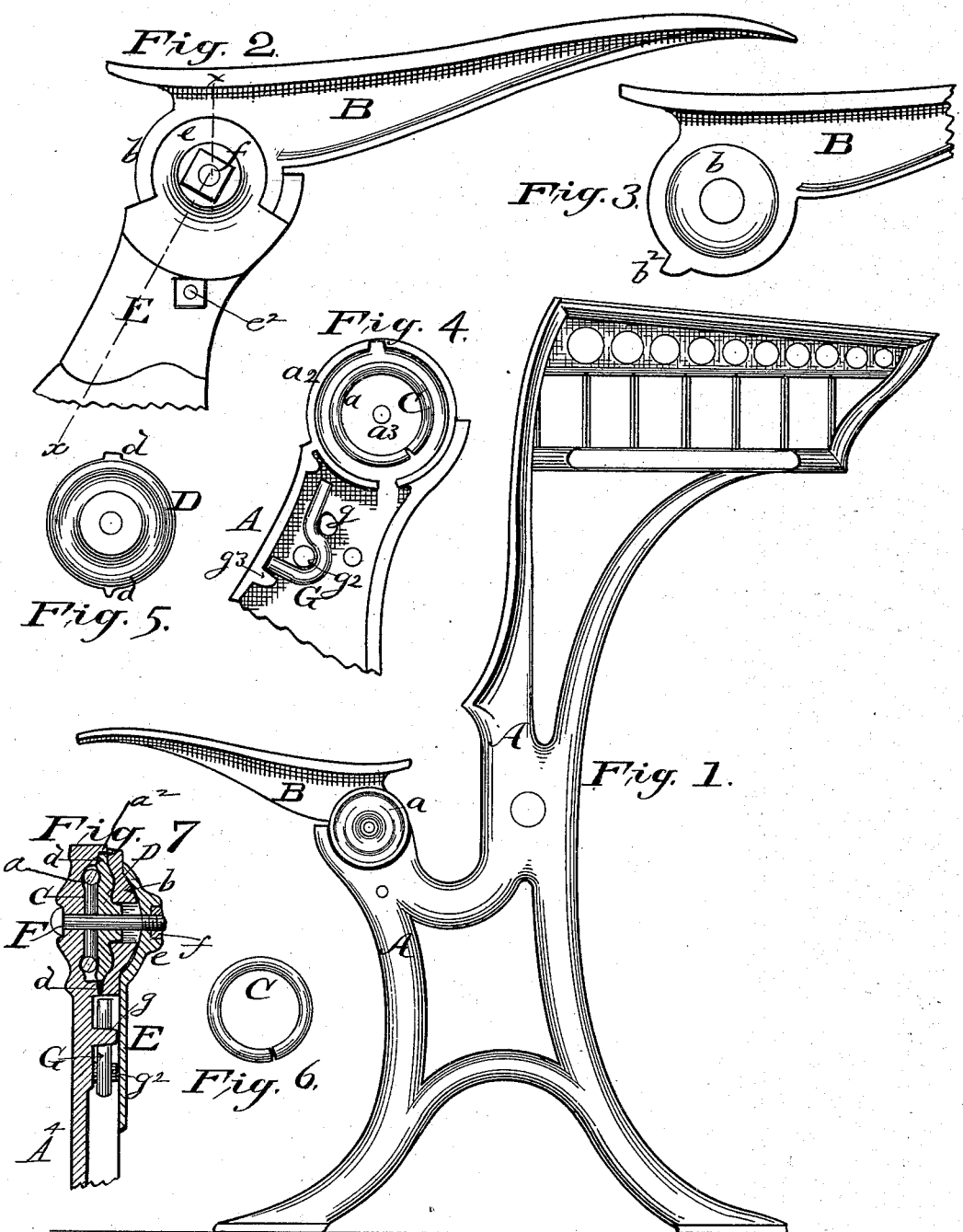
Witnesses.
Geo. B. Tibbitts
F. R. Tibbitts
Inventor,
John Aenis,
By Geo. W. Tibbitts Atty

UNITED STATES PATENT OFFICE.

JOHN AENIS, OF CLEVELAND, OHIO, ASSIGNOR TO THE CLEVELAND SCHOOL FURNITURE COMPANY, OF SAME PLACE.

SCHOOL-DESK.

SPECIFICATION forming part of Letters Patent No. 416,660, dated December 3, 1889.

Application filed April 3, 1889. Serial No. 305,867. (No model.)

*To all whom it may concern:*

Be it known that I, JOHN AENIS, a citizen of the United States, residing at Cleveland, in the county of Cuyahoga and State of Ohio, have invented certain new and useful Improvements in School-Desks, of which the following is a specification.

This invention relates to school-desks and the like furniture, and has for its object to provide a noiseless joint for the seat-hinge; and it consists in the peculiar construction and combination of the parts comprising said joint, as hereinafter described, and pointed out in the claim.

In the accompanying drawings, Figure 1 is a side elevation of the frame and support of a desk containing my improvement. Fig. 2 is an enlarged inside face view of the seat-hinge joint. Fig. 3 is a detached view of the inner end of the seat-arm. Fig. 4 is an inside face view of seat-arm support, showing a friction-ring and a concussion-spring. Fig. 5 is a detached view of a disk-covering for the friction-ring. Fig. 6 is a detached view of the friction-ring, and Fig. 7 is a sectional view in line $x\ x$ of Fig. 2.

A represents a side elevation of a seat and desk-frame.

B is a seat-arm.

To the projection of said frame to which the seat is attached is provided a disk $a$, having an annular rim $a^2$ and an eye $a^3$ for a bolt F. On the inner face of said disk is made a slight recess for a ring C, and over this ring is placed a disk D, having lugs $d\ d$, resting in notches or recesses in the rim $a^2$, and over this disk is placed the disk $b$ on the seat-arm B, and this is covered by a disk $e$ on the plate E, which is secured by a nut or screw $e^2$.

Through the several disks $a$ D $b$ $e$ is placed a bolt F, whose nut $f$ rests in a recess in the disk $e$.

In the chamber below these disks in the frame A, and covered by the plate E, is placed a spring G, formed of wire and held in place by the lugs $g\ g^2\ g^3$. This spring is provided for a lug $b^2$ on the seat-arm B to strike against when the seat is turned down, to receive the concussion and to prevent noise or jar.

The ring C and disk D are for providing sufficient friction to hold seat-arm from falling, the ring C being inserted to form a cushion or yielding friction-bearing.

The working of this device is as follows: When the seat is down, the lug $b^2$ bears against the end of spring G, and thus the seat has a slight springy action when sat upon. When the seat is turned up, the friction of the disk D and ring C is sufficient to hold it in an upright or partially-upright position. The seat may be readily turned down with slight force, and if it be pushed down suddenly or forcibly there is no audible shock or blow, as the lug $b^2$ strikes the spring G, which prevents any noisy concussion.

Having described my invention, what I claim is—

The seat-arm A, having disk $a$ integral therewith, and provided with annular rim $a^2$ and recessed, as described, the seat-arm B, having disk $b$ integral therewith and provided with a lug $b^2$, in combination with ring C, disk D, having the lugs $d\ d$, the plate E, having disk $e$, the bolt F and nut $f$, and the spring G, held by lugs $g\ g^2\ g^3$, all constructed and operating substantially as described.

JOHN AENIS.

Witnesses:
GEO. W. TIBBITTS,
JOHN W. TAYLOR.